US012698961B2

(12) United States Patent
Lehtonen et al.

(10) Patent No.: US 12,698,961 B2
(45) Date of Patent: Aug. 4, 2026

(54) ARRANGEMENT FOR OPTICAL MEASUREMENTS AND RELATED METHOD

(71) Applicant: HEXAGON INNOVATION HUB GMBH, Heerbrugg (CH)

(72) Inventors: Petri Lehtonen, Tampere (FI); Lukas Scheer, Tampere (FI)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 75 days.

(21) Appl. No.: 18/729,862

(22) PCT Filed: Jan. 18, 2023

(86) PCT No.: PCT/EP2023/051153
§ 371 (c)(1),
(2) Date: Jul. 17, 2024

(87) PCT Pub. No.: WO2023/139136
PCT Pub. Date: Jul. 27, 2023

(65) Prior Publication Data
US 2025/0146812 A1 May 8, 2025

(30) Foreign Application Priority Data
Jan. 18, 2022 (FI) ...................................... 20227007

(51) Int. Cl.
*G01B 11/25* (2006.01)
(52) U.S. Cl.
CPC ..................................... *G01B 11/25* (2013.01)
(58) Field of Classification Search
CPC ............................. G01B 11/25; G01B 11/2513
See application file for complete search history.

(56) References Cited

U.S. PATENT DOCUMENTS 8,032,017 B2 * 10/2011 Pastore .................. G03B 15/06
348/370
2007/0097686 A1 5/2007 Dunn et al.
(Continued)

FOREIGN PATENT DOCUMENTS

EP 2745073 A1 6/2014
WO 2012069664 A1 5/2012
(Continued)

OTHER PUBLICATIONS

FI Office Action dated Apr. 12, 2022 in application 20227007.

*Primary Examiner* — Hina F Ayub
(74) *Attorney, Agent, or Firm* — Maschoff Brennan

(57) ABSTRACT

An arrangement for optically measuring the surface, such as surface shape and/or associated surface defects, of an optionally glossy target object, comprising: a diffusive, semi-transparent illumination structure defining a hollow, preferably curved, elongated surface shape, constituting a tunnel shape, configured to surround at least one target object at least partially, a number of LED (light-emitting diode) light sources optically coupled to the illumination structure for illuminating at least one target object via the surface of the illumination structure, wherein the light sources are situated at a distance from the surface of the illumination structure, wherein the LED light sources are arranged in a matrix array along the curvilinear cross-section of the illumination structure and along the length of the tunnel shape of the illumination structure, at least one imaging device, configured to image the target object.

22 Claims, 11 Drawing Sheets

(56) References Cited

U.S. PATENT DOCUMENTS

| | | |
|---|---|---|
| 2011/0310242 A1 | 12/2011 | Knupfer et al. |
| 2014/0376003 A1 | 12/2014 | Keranen et al. |
| 2015/0160002 A1 | 6/2015 | Nayar |
| 2018/0106728 A1 | 4/2018 | Hayashi |
| 2019/0287237 A1 | 9/2019 | De Bonfim Gripp et al. |
| 2023/0204345 A1 * | 6/2023 | Ishigaki .................. G06T 7/521 |
| | | 356/511 |

FOREIGN PATENT DOCUMENTS

| | | |
|---|---|---|
| WO | 2013/102572 A1 | 7/2013 |
| WO | 2016/107969 A1 | 7/2016 |
| WO | 2018088423 A1 | 5/2018 |
| WO | 2018098551 A1 | 6/2018 |
| WO | 2019/223847 A1 | 11/2019 |
| WO | 2021/255191 A1 | 12/2021 |

* cited by examiner

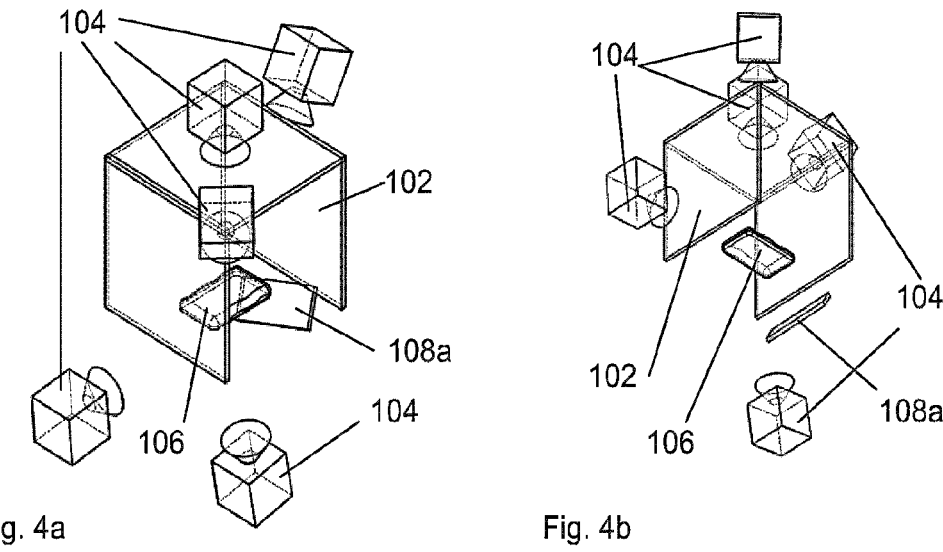
Fig. 4a
Fig. 4b
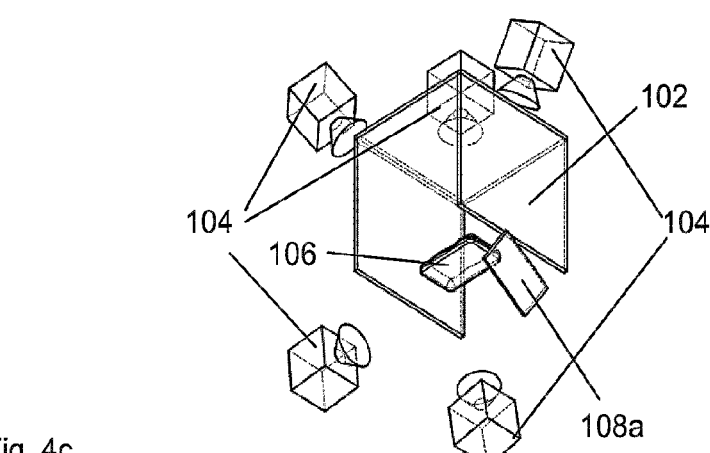
Fig. 4c
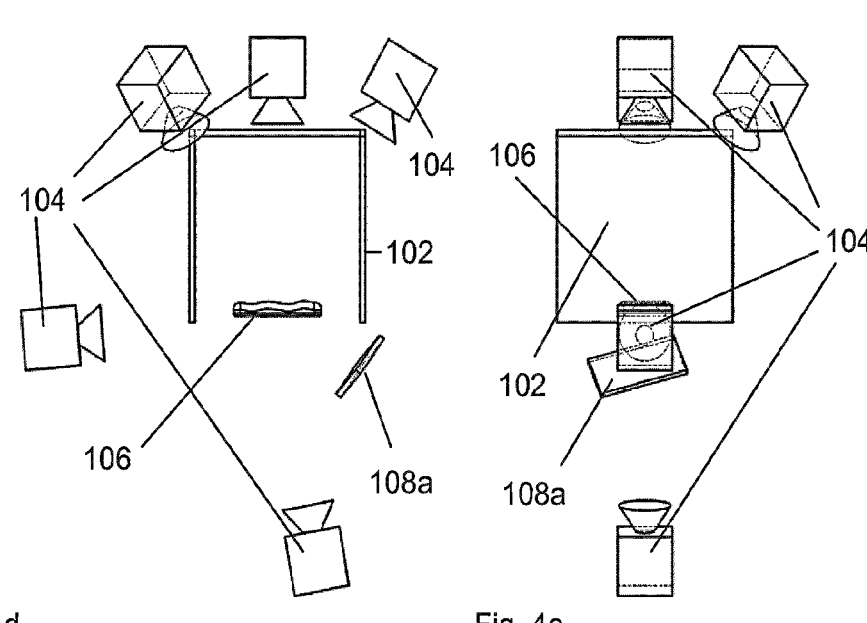
Fig. 4d
Fig. 4e

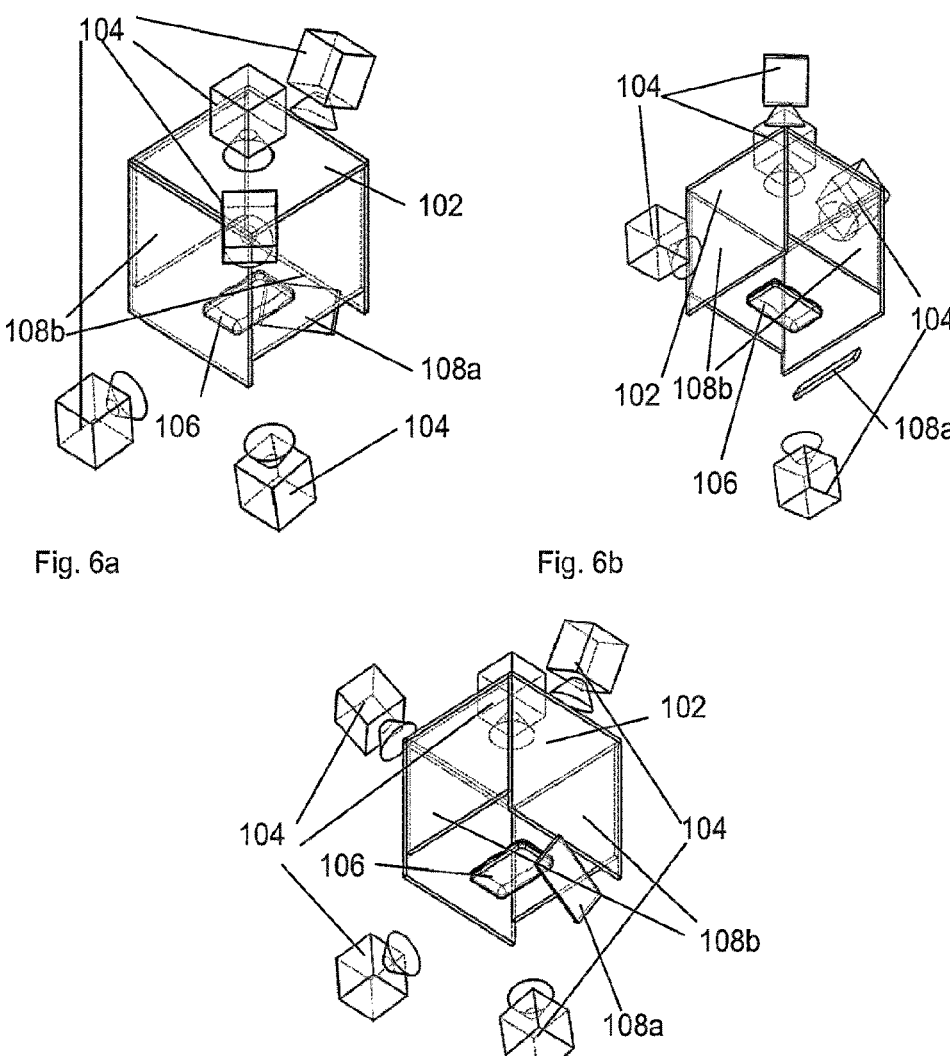
Fig. 6a
Fig. 6b
Fig. 6c
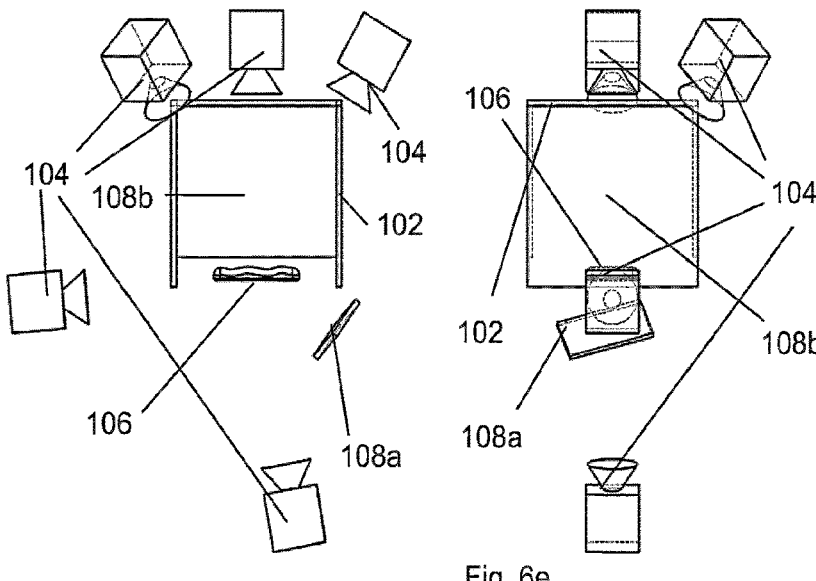
Fig. 6d
Fig. 6e

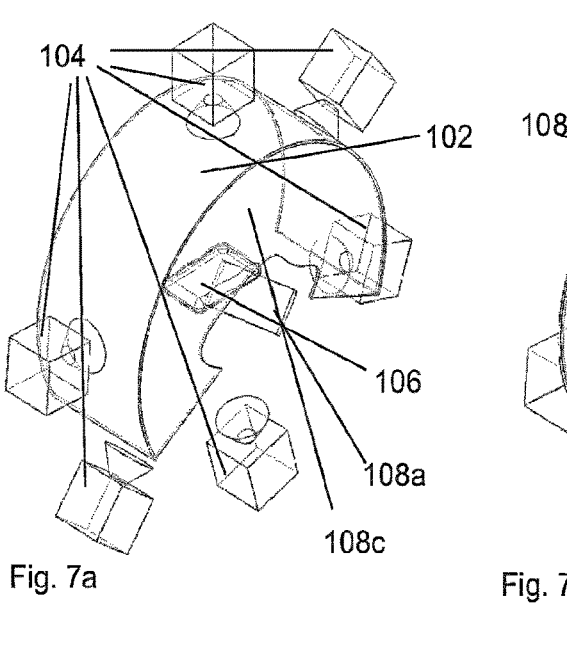
Fig. 7a
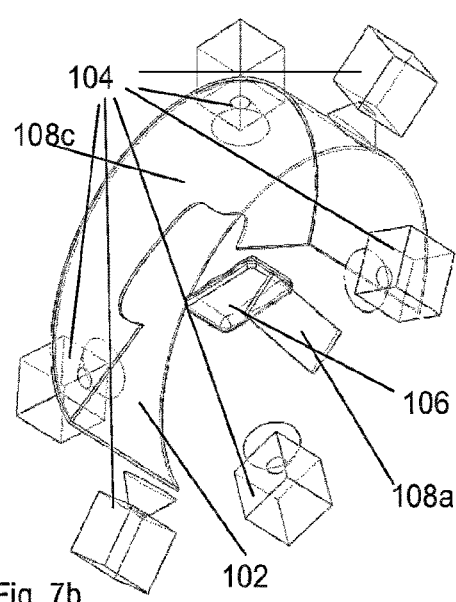
Fig. 7b
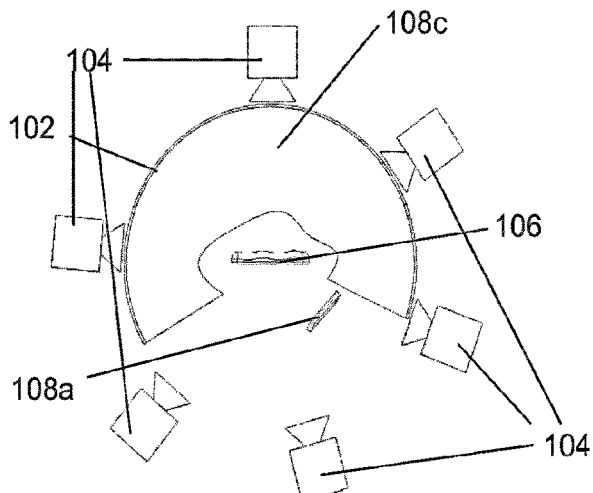
Fig. 7c
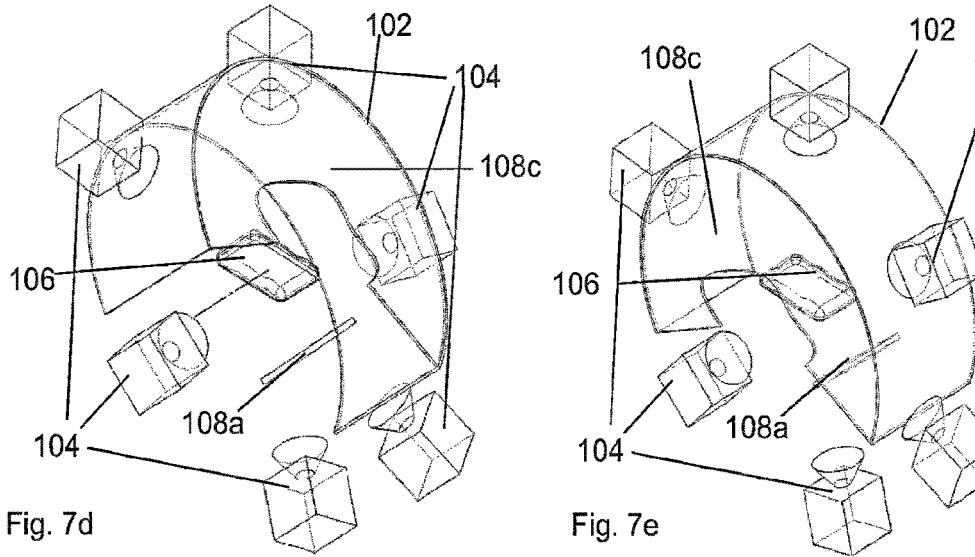
Fig. 7d
Fig. 7e

102

102

102

102

ARRANGEMENT FOR OPTICAL MEASUREMENTS AND RELATED METHOD

FIELD OF THE INVENTION

Generally the present invention relates to optics. In particular, however not exclusively, the present invention concerns optical measurement solutions for determining the topography of target objects.

BACKGROUND

Measuring the topography of high-curvature surfaces associated with various objects has been a difficult problem. Some different methods for surface-inspection have been presented but a typical shortcoming is that objects need to be inspected individually or in small batches, which is time-consuming.

The solutions that utilize diffusing structures are mainly based on shapes that cover the whole of the sample. These solutions typically limit the type of target objects that can be inspected. An example of a known solution includes the use of a dome-shaped diffusor. However, these kinds of diffusors have a shortcoming of having to use a robotic-arm or the like to move samples in and out of the diffusor, which is a bottleneck in terms of the inspected sample size and speed at which samples may be inspected. Alternatively, in some solutions the diffusor or such light-source, such as a flexible display, may be moved over a sample or a set of samples but these solutions essentially suffer from the same shortcomings as the aforementioned.

SUMMARY OF THE INVENTION

The objective is to at least alleviate one or more aforesaid problems and to provide an arrangement and related method for measuring the shape of a target object optionally having a glossy surface.

One particular advantage of the present invention is that it uses a half-arc shaped diffusor and a modular LED matrix thereon, which allow for different shapes, sizes and sets of samples to be analyzed. Additionally, the arrangement may be used for continuous measurement of samples wherein samples are moved on a conveyor directly in and out of the arrangement. Further, the arrangement of the present invention is modular and can be scaled easily for different preferences and applications.

The objective is achieved by different embodiments of an arrangement for optically measuring the surface, such as surface shape and/or associated surface defects, of an optionally glossy target object, comprising:

a diffusive, semi-transparent illumination structure defining a hollow, preferably curved, elongated surface shape, constituting a tunnel shape, configured to surround at least one target object at least partially, a number of LED (light-emitting diode) light sources optically coupled to the illumination structure for illuminating at least one target object via the surface of the illumination structure, wherein the light sources are situated at a distance from the surface of the illumination structure, wherein the LED light sources are arranged in a matrix array along the curvilinear cross-section of the illumination structure and along the length of the tunnel shape of the illumination structure, at least one imaging device, configured to image the target object through at least one, optionally lens-provided, apertures, in the illumination structure or from an open position on a side of the illumination structure, such that the illumination structure is not in between the imaging device and target object, and a control entity configured to instruct said LED light sources to form an image sequence of predetermined illumination patterns on the surface of the illumination structure to illuminate the target object with said patterns projected via said surface, to instruct the at least one imaging device to obtain one or more images of the target object relative to each illumination pattern, and to derive, through the utilization of said patterns utilized and images obtained, a predetermined surface-related property of the target object.

Further embodiments of the present invention are also presented in the dependent claims.

In another aspect, a method for optically measuring a surface of a target object, comprising obtaining a diffusive, semi-transparent illumination structure defining a hollow, preferably curved, elongated surface shape, constituting a tunnel shape, configured to surround at least one target object at least partially, wherein a number of LED (light-emitting diode) light sources optically coupled to the illumination structure for illuminating at least one target object via the surface of the illumination structure, wherein the light sources are situated at a distance from the surface of the illumination structure, wherein the LED light sources are arranged in a matrix array along the curvilinear cross-section of the illumination structure and along the length of the tunnel shape of the illumination structure, obtaining at least one imaging device, configured to image the target object through at least one, optionally lens-provided, apertures, in the illumination structure or from an open position on a side of the illumination structure, such that the illumination structure is not in between the imaging device and target object, and controlling LED (light-emitting diode) light sources to form an image sequence of predetermined illumination patterns on the surface of the illumination structure to illuminate the target object with said patterns projected via said surface and instructing said at least one imaging device to obtain one or more images of the target object relative to each illumination pattern, and deriving, through the utilization of said patterns utilized and images obtained, a predetermined surface-related property such as shape and/or dimensions of the target object or at least part thereof.

The previously presented considerations concerning the various embodiments of the arrangement may be flexibly applied to the embodiments of the method mutatis mutandis as being appreciated by a skilled person.

The utility of the present invention arises from a plurality of different issues depending on the embodiment. The devised solution enables measuring the 3d shape, orientation and dimensions of various glossy items and related surfaces such as faucet, china, tableware, glass, mirrors, and various other e.g. chrome-plated, lacquered or painted surfaces utilizing an illumination unit that is tunnel-shaped, so that inspected parts can be fed through the system and still be covered to collect as many reflected light rays to camera as possible.

The provided technical arrangement may be used to enable formation of various illumination patterns to be used for different measurement methods for both glossy (specular) and scattering (diffusive) surfaces of different target objects.

The provided arrangement is affordable to manufacture and tested, easily obtainable hardware may be utilized therewith. The associated procedure for hardware control and image analysis is both rapid and requires no special hardware either. Ordinary computing elements such as microcontrollers, microprocessors and/or DSPs (digital signal processor) may be applied together with suitable external memory chip(s) or integrated memory. For example, a contemporary laptop or desktop computer may be configured to control the arrangement and/or analyze the obtained images. Further, the techniques for controlling a number of light sources to form a sequence of predetermined illumination patterns illuminating the target object via the surface of the illumination structure and instructing the at least two imaging devices to obtain an image of the target object relative to each illumination pattern, and deriving, through the utilization of said patterns utilized and images obtained, a predetermined surface-related property such as shape and/or dimensions of the target object or at least part thereof have been previously discussed with similar measurement arrangements that however differ in their electromechanics, i.e. the shape and arrangement of the illumination structure and light sources.

The expression "a number of" refers herein to any positive integer starting from one (1), e.g. to one, two, or three.

The expression "a plurality of" refers herein to any positive integer starting from two (2), e.g. to two, three, or four.

The term "surface element" may herein refer to a surface point or area of the target object to be inspected by the suggested optical measurement arrangement. The surface element may thus represent a basic unit from which the target object is considered to be at least logically formed in terms of the measurement. In many measurements, both location and orientation of such surface element is in the interest of the measurer. The dimensions, or size, of the surface elements may vary depending on the resolution of the measurement arrangement as a whole including the resolution of the applied imaging devices, spacing and nature of the light source, configuration of the illumination structure, etc.

The terms "a" and "an", as used herein, are defined as one or more than one.

Various different embodiments of the present invention are also disclosed in the dependent claims.

BRIEF DESCRIPTION OF THE RELATED DRAWINGS

Next the invention is described in more detail with reference to the appended drawings in which FIG. 1 illustrates the basic principles of an embodiment of the arrangement in accordance with the present invention.

FIGS. 4a, 4b, 4c, 4d and 4e illustrate aspects of an embodiment of the arrangement in accordance with the present invention.

FIGS. 6a, 6b, 6c, 6d and 6e illustrates aspects of an embodiment of the arrangement in accordance with the present invention.

FIGS. 7a, 7b, 7c, 7d and 7e illustrate aspects of an embodiment of the arrangement in accordance with the present invention.

Figure 8:
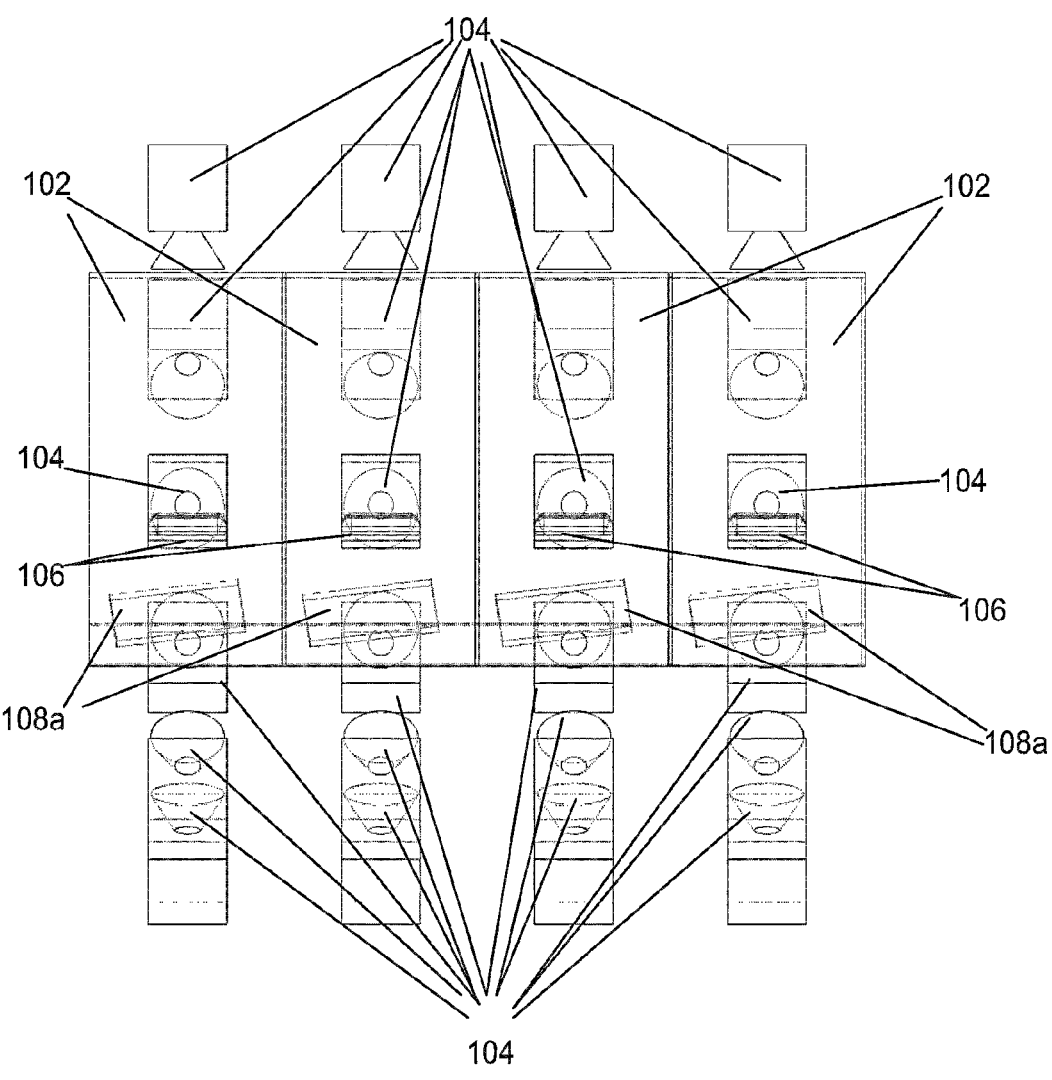

FIG. 8 illustrates an embodiment of the arrangement wherein the illumination structures are in series in accordance with the present invention.

Figure 9A:
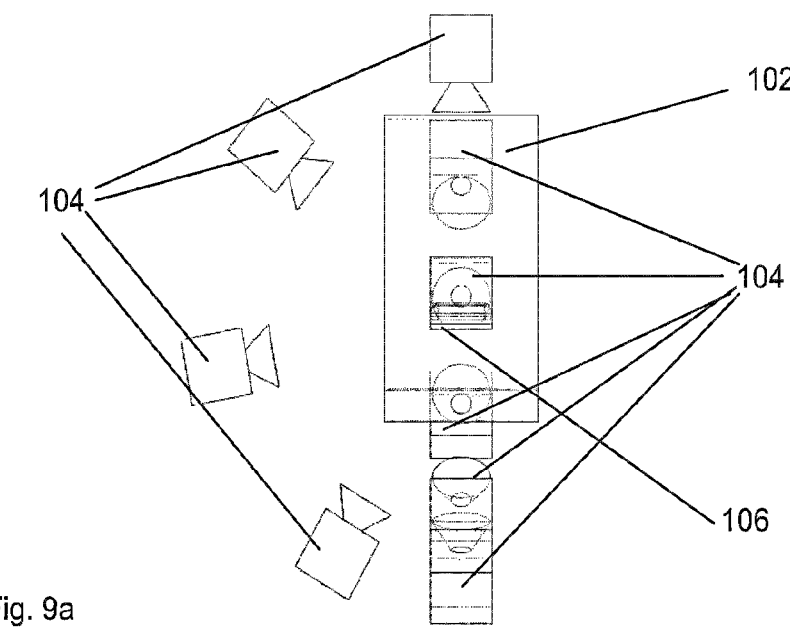
Figure 9B:
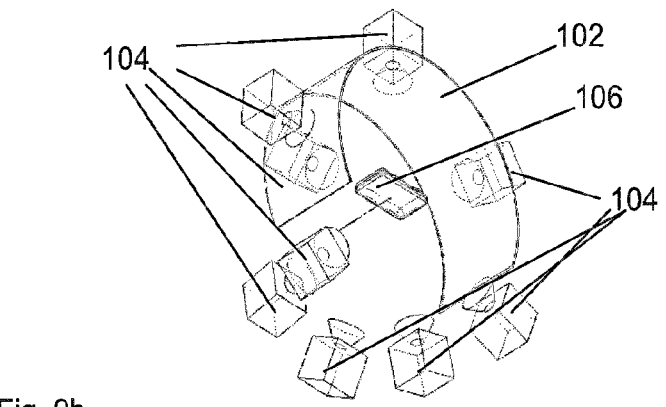
Figure 9C:
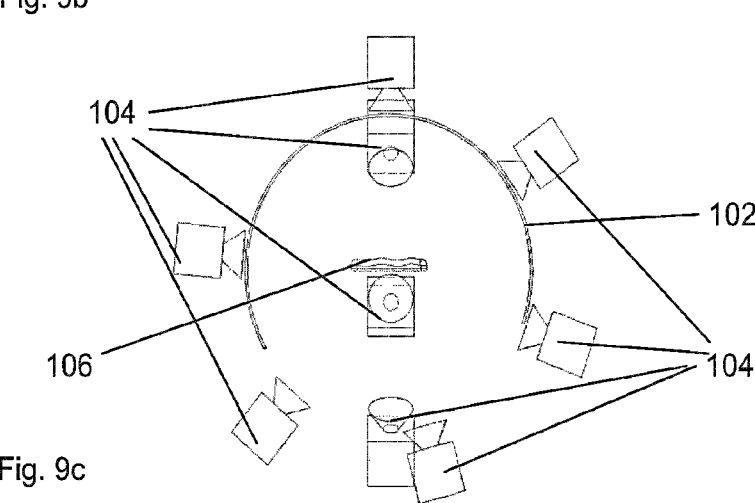
Figure 10A:
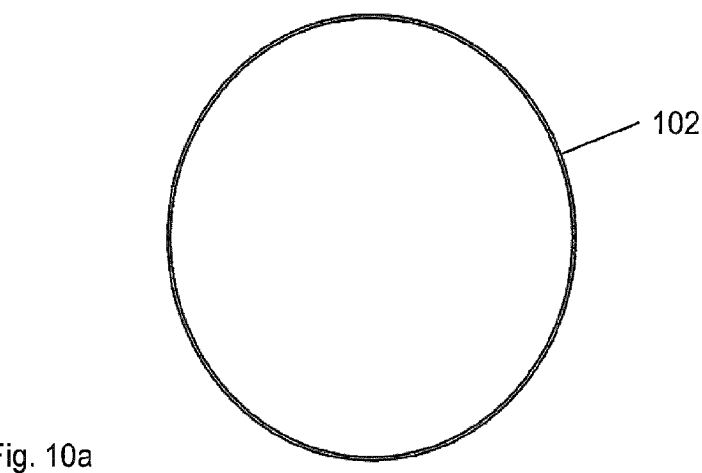
Figure 10B:
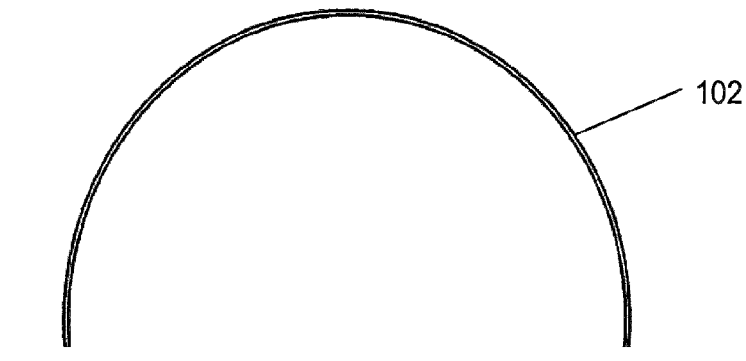
Figure 10C:
Figure 10D:
Figure 11A:
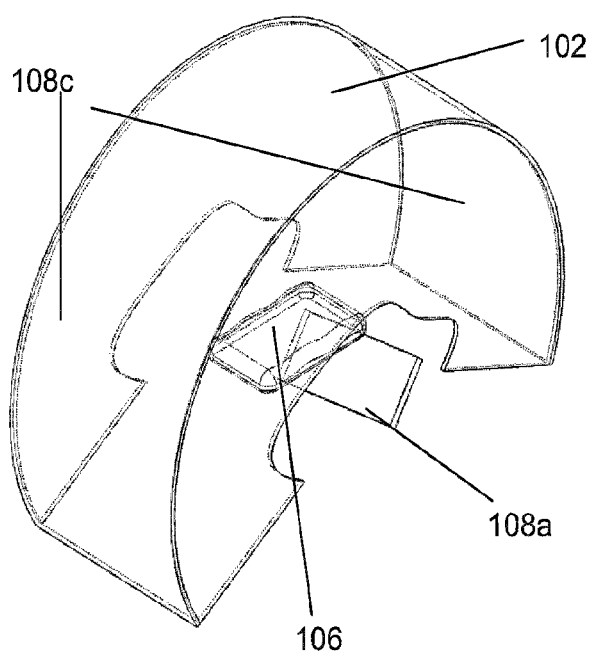
Figure 11B:
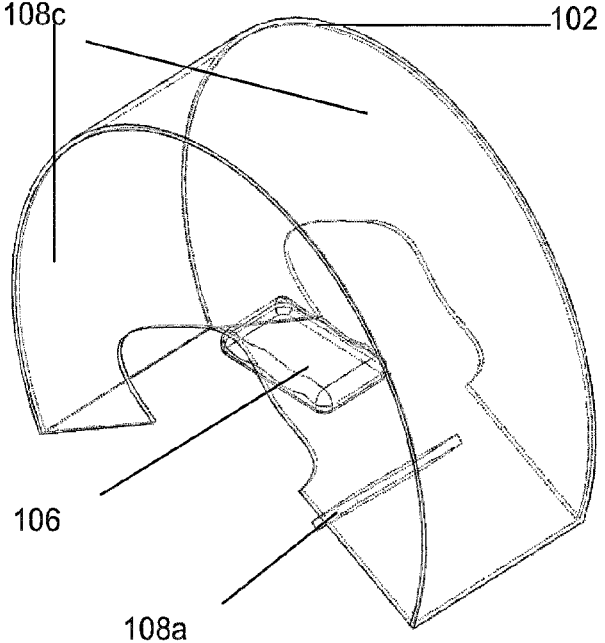
Figure 11C:
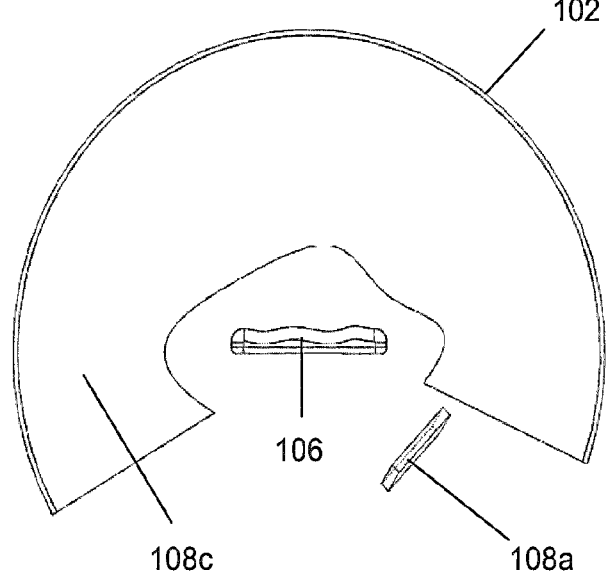
Figure 11D:
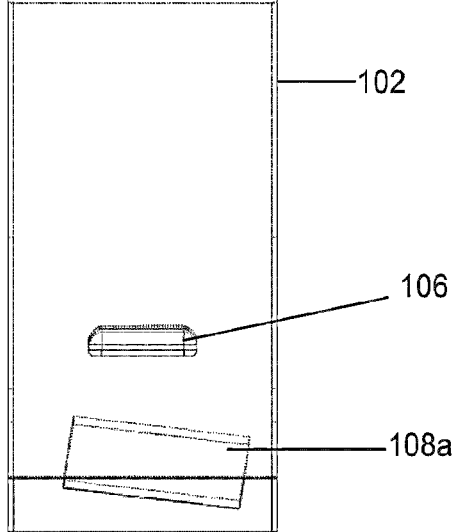

FIGS. 9a, 9b and 9c illustrate aspects of an embodiment of the arrangement in accordance with the present invention.

FIGS. 10a, 10b, 10c and 10d illustrate illumination structure embodiments of the arrangement in accordance with the present invention.

FIGS. 11a, 11b, 11c and 11d illustrate aspects of an embodiment of the arrangement in accordance with the present invention.

DETAILED DESCRIPTION OF THE EMBODIMENTS

Figure 1:
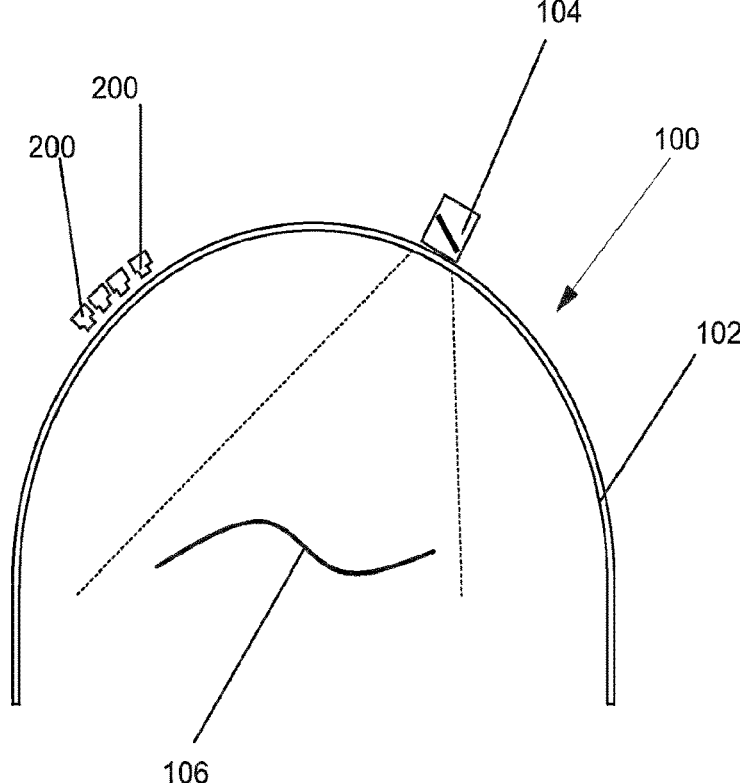

In FIG. 1, the basic principles of an embodiment of the arrangement (100) in accordance with the present invention are illustrated. The arrangement (100) comprises at least a diffusive, semi-transparent illumination structure (102) defining a hollow, preferably curved, elongated surface shape, constituting a tunnel shape, configured to surround at least one target object (106) at least partially. The illumination structure (102) comprises a tunnel shape, which may comprise a cross-section of a half-arc as illustrated, or a full circle, oval or such curvilinear shape with a preferred length and dimensions. The curvilinear cross-section combined with an elongated profile constitute the tunnel shape, which allows the illumination structure (102) to cover a number of target objects (106) thereunder. The illumination structure (102) may generally bear a symmetrical shape as shown in FIG. 1. Alternatively, the illumination structure (102) may have a quadrilateral cross-section. The illumination structure (102) may be placed on a conveyor allowing target objects (106) to be moved under and through the illumination structure (102). Hence, the illumination structure (102) may have open ends to allow conveying of target objects (106) or samples in relation to and under the illumination structure (102). The illumination structure (102) may be also set at a preferred position and need not be directly above the target object (106) meaning that the illumination structure (102) may be set at an angle in relation to inspected target objects (106).

Various light rays emitted LED light sources (202) and reflecting, from the surface of the sample (106), back towards the illumination structure (102) and especially towards the associated imaging device (104) have been depicted as solid and dotted lines in the figure for illustrative purposes.

The arrangement (100) further comprises a number of LED (light-emitting diode) light sources (202), illustrated as part of modules (200) as explained hereinafter, optically coupled to the illumination structure (102) for illuminating at least one target object (106) via the surface of the illumination structure (102), such that desired illumination patterns may be established and conveyed by the structure (102) towards the sample (106) for subsequent imaging. The LED light sources (202) are situated at a distance from the surface of the illumination structure (102), which distance may be for example 0-20 millimeters, 0-10 millimeters or at least greater than zero.

The arrangement (100) further comprises at least one light-sensitive sensor device or an imaging device (104), such as a digital, CMOS or CCD cameras camera, configured to image the target object (106), so as to capture light rays emitted by the light sources (202) and reflected by the target object (106) towards the structure imaging device (104). The imaging device (104) may in some embodiments be arranged to image the target object (106) through at least one aperture in the illumination structure (102). The aperture may be a lens or a lens arrangement comprising a number of lenses, optionally comprising at least one singlet or doublet lens. In case of a plurality of lenses the lenses may be arranged in series and a lens of said plurality disposed prior to at least one other lens of said plurality in the optical path has a diameter smaller than the other lens. Further, the lens arrangement may comprise a body portion facing the aperture with a beveled edge to reduce the shadowing effect of the lens arrangement relative to the illumination structure. Alternatively, the imaging device (104) may be arranged to an open position in relation to the illumination structure (102), such as on an open side of the illumination structure (102) wherein the imaging device (104) is configured to image the target object (106) without having the illumination structure (102) between the imaging device and target object (106). In some embodiments, a plurality of imaging devices (104) may be used and they may be aligned to image the same sample area (or sample space) from different angles. In some embodiments, a plurality of imaging devices (104) may arranged symmetrically in relation the illumination structure (102) to image the same sample area (or sample space) from different angles. In some embodiments, one or more imaging devices (104) may be arranged to image through the illumination structure (102) and one or more imaging devices (104) can at the same time be arranged to image the target object from a position or angle not obstructed by the illumination structure (102), such as at the end of illumination structure (102) or under the illumination structure (102).

Further, the arrangement (100) utilizes a control entity configured to instruct the LED light sources (202) to form an image sequence of predetermined illumination patterns on the surface of the illumination structure (102) to illuminate the target object (106) with said patterns projected via said surface, to instruct the at least one imaging device to obtain an image of the target object (106) relative to each illumination pattern, and to derive, through the utilization of said patterns utilized and images obtained, a predetermined surface-related property of the target object (106). The control entity may form or be formed from a more general computer device that is suitable for other uses as well. The control entity may comprise a processing device which may include a microprocessor, microcontroller, a DSP, programmable logic array, or a desired plurality of any of those, for instance. The control entity may further comprise a memory which may comprise at least one dedicated memory chip or memory integrated with the processor, for instance. The memory may be configured to accommodate a computer program comprising code elements in the form of computer-executable instructions and related other data for controlling the arrangement. Further, the memory may be utilized to host the measurement data and associated analysis results. The computer program may be embodied on a carrier medium such as a memory card or an optical disc.

The control entity may be arranged to carry out the illumination patterns, imaging and determination of the predetermined surface-related properties of the target object (106) with various known inspection techniques. The control entity is arranged to utilize sinusoidal illumination patterns, a repeating pattern whose intensity varies in one axis but is constant in the other and which repeating pattern could be anything mathematically feasible, such as a rectangular wave or sine wave. This pattern generally "slides" along some axis and multiple images are taken at different phases of this pattern projected on the object (106) under inspection. To be able to create such a pattern with predictable behavior, the placement of the light sources (202) should be straight at least along the constant axis of the pattern for which reason the modules (200) comprising the LED light sources (202) are arranged at straight rows adjacent to each other. Examples of suitable techniques for carrying out the illumination patterns, imaging and determination of the predetermined surface-related properties of the target object (106) with various known inspection techniques are known and widely presented for example in patent publications WO 2013/102572 A1 (inventors Keränen and Lehtonen) and WO 2016/107969 A1 (inventors Lehtonen and Holmlund), which however differ in the illumination structure and light sources arrangement used. By the techniques discussed in the aforementioned sources the arrangement (100) may be configured to determine at least one surface-related property of the target object (106) selected from the group consisting of: surface orientation, spatial abruption in the measured surface property such as in the indication of surface orientation, surface shape, surface dimensions, object dimensions, object size, and object volume. Additionally, the arrangement (100) may be configured to apply at least one, preferably periodic, illumination pattern including a linear intensity ramp or a sinusoidal pattern such as a sinusoidal fringe pattern with sinusoidally changing intensity. Even further, the arrangement (100) may be configured to apply a sequence of at least one, preferably at least three, illumination patterns to obtain at least a respective number of images, preferably per imaging device, for determining the desired surface properties. Even further, the arrangement (100) may be configured to apply photometric stereo illumination patterns and imaging for measuring a predetermined surface property, such as abruption potentially indicative of a surface flaw, of a scattering surface of the target object (106).

Figure 2:
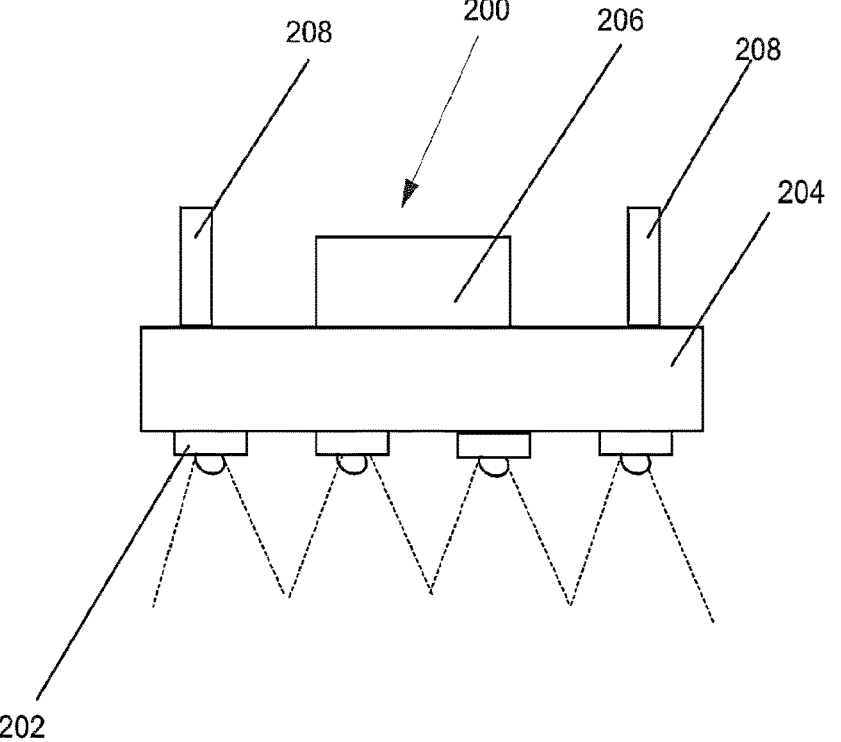
FIG. 2 illustrates aspects of an embodiment of the arrangement in accordance with the present invention.
Figure 3:
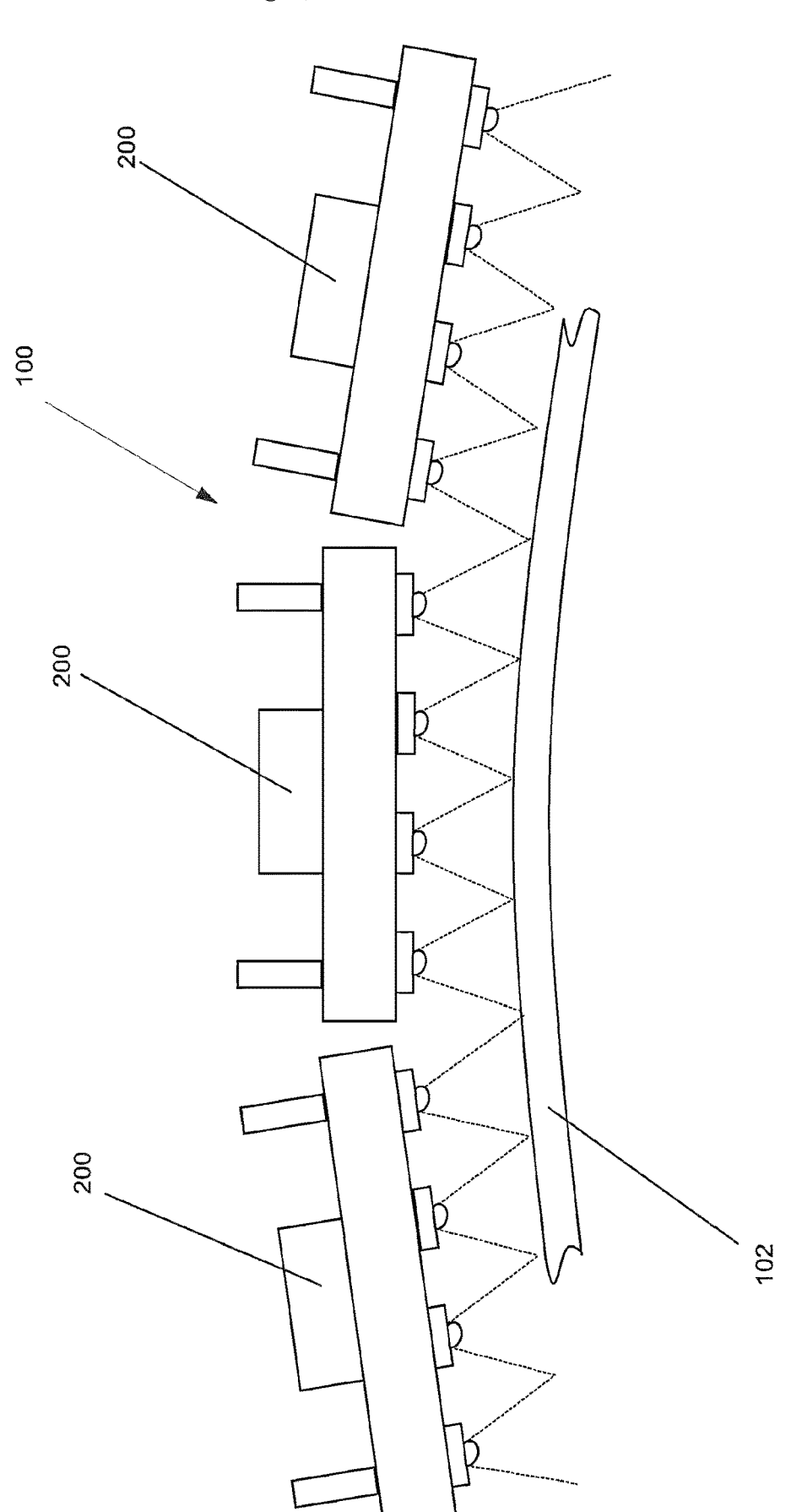
FIG. 3 illustrates aspects of an embodiment of the arrangement in accordance with the present invention.
Figures 5A, 5B, 5C, 5D, 5E:
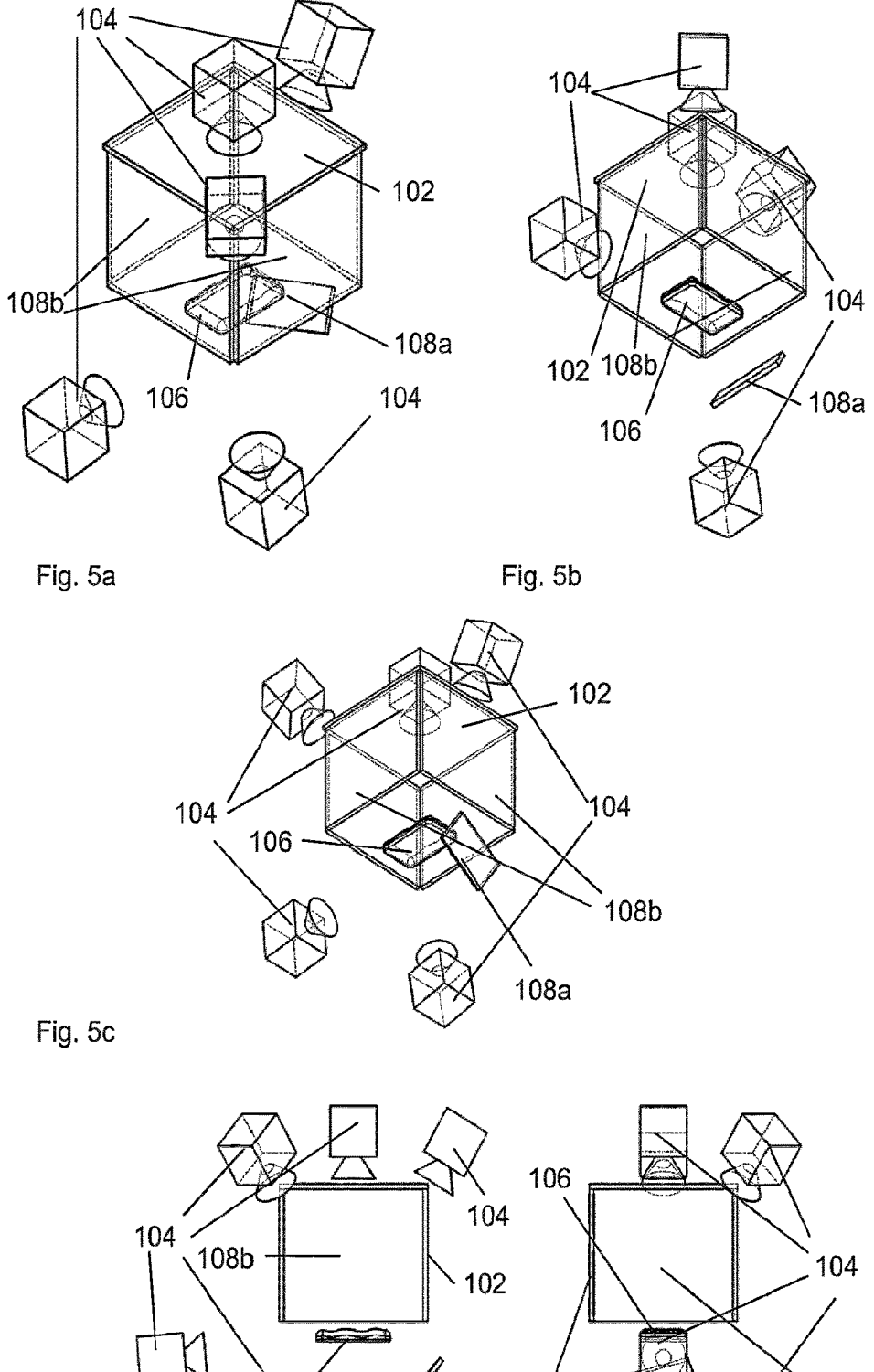
FIGS. 5a, 5b, 5c, 5d and 5e illustrates aspects of an embodiment of the arrangement in accordance with the present invention.

The FIGS. 2 and 3 illustrate aspects of an embodiment of the arrangement (100) in accordance with the present invention. In particular, aspects of a LED (light-emitting diode) light source module (200) or pack are presented. The present invention utilizes preferably high-power LEDs (202). The LEDs (202) are arranged as a matrix to form large area pattern display.

The individual LEDs (202) may have a spacing approximately 1-20 mm or 110 mm from each other. However, the illumination structure (102) is used to this specific reason to hide the gaps between the LEDs and to achieve continuously projected patterns. As previously mentioned, the LEDs (202) may be arranged at a distance from the illumination structure (102) to allow the LED light to spread and cover the diffusor more uniformly. This gap may be an air gap or the gap can also be filled by any optically clear material, such as acrylic, polycarbonate, glass, etc. The distance of this gap depends on the LED spacing, LED beam opening shape and angle, as well as the type of diffusor used. Typically LED beam opening angle is around 120 degrees, which means individual LED light beams start to overlap each other around same distance than LED spacing. Typically, a gap length of 1-10 mm is used, but this is heavily affected by the diffusor type, dimensions and material.

The diffusive, semi-transparent illumination structure (102) may be light-shaping or diffusing type diffusor. Some conventional diffusing diffusors use a semitransparent material, typically achieved by light scattering material inside a plastic or glass sheet. The illumination structure (102) of the present invention is preferably a light shaping diffusor having a substantially rough outer surface that refracts light rays in different directions due to altering refraction angles, whereas the bulk material of the diffusor is otherwise clear. By changing the thickness of the light shaping type diffusor it is possible to affect the air gap size. In some embodiments the gap length between the LED and the illumination structure (102) surface can be essentially zero depending on the illumination structure (102).

As illustrated in FIG. 3 the LED light sources (202) are arranged in a matrix array along the curvilinear cross-section of the illumination structure. The matrix preferably extends also along the length of the tunnel shape of the illumination structure. As illustrated the LED light sources (202) may be arranged over the illumination structure (102) in modules (200).

The LED light sources (202) may be provided on a PCB (204). The LED light sources (202) may be provided on a flexible or elastic substrate, such as a printed electronics strip or mat of LEDs. In order to arrange the LED light sources (202) along a curvilinear path in relation to the illumination structure (102) shape several narrow modules (200) are used adjacent to each other so that the PCBs (204) need not be bent. The modules (200) are set at a small angle relative to each other. This way a curvilinear arc-shape may be formed from small flat areas. Therefore, even rigid modules (200) may be attached for example by screw tower (208) to form preferred matrices of LED light sources (202) that form a continuously curved arc where illumination patterns are formed on the illumination structure (102).

Width of a module (200) can also be varied. Wider module (200), i.e. a module (200) having more LED light sources (202) adjacent to each other on the PCB (204), enables smaller amount of modules (200) to be used, but distance between LED light sources (202) and the illumination source (202) needs to be also changed. In this case, if the LED light source (202) in the center of the module (200) is in a suitable distance from the illumination structure (102), each LED light source (202) towards the edge, i.e. away from the center, has a longer distance, which affects the illumination pattern. Conversely, a narrower module (200), i.e. a module (200) having fewer LED light sources (202) adjacent to each other on the PCB (204), enables better control of the LED light source (202) to illumination structure (102) distance, but the amount of modules (200) adjacent to each other needs to be increased. Examples of suitable amount of LED light sources (202) on a PCB (204) adjacent to each other include 1-10 and 1-20 LED light sources (202).

As mentioned, the illustrated gap between the LED light sources (202) and the illumination structure (102) may comprise only air or for example clear plastic therebetween. Alternatively, the illumination structure (102) can be clear on the side of LED light sources (202) and diffusive on the other side, i.e. the side of the target object (106), in which case the LED light sources (202) may be directly attached to the clear surface of the illumination structure (102). Alternative or additional optional arrangements in or forming the gap may include optical means, such as lenses, mirrors or shades, or non-optical, such as EMC, elements if needed.

Each module (200) also comprise a connector for power and data (206) for controlling the LED light sources (202) thereat. Controlling of LED light sources (202) can be made in various ways. Preferably smart LED light sources (202) that are connected to one data line that is controlled with serial data are used. Each LED light source (202) reads the serial data, takes first data packet of it and sends rest to following LED light sources (202). This way each module (200) may have only four wires: Power, Ground, Data and Clock. Refresh rate of LED matrix depends on amount of LED in one data line. For example, in an arrangement of 4×50, i.e. 4 adjacent LED light sources (202) as illustrated in rows of 50 on one module (200), a total of 200 LED light sources (202) in one module (200) are covered by one data line. The LED light sources (202) may also be controlled row-by-row or column-by-column-wise, such that each row or column is lit by the same value and the pattern varies only along the other axis. Various different types of matrixes for the LED light sources (202) are conceivable but preferably the present invention utilizes a matrix of a rectangular pattern. Alternatively, an equilateral triangle pattern may be used. To adequately cover a target object (106) with the illumination and get maximum light back to the imaging device (104), the LED light source (202) matrix combined with illumination structure (102) should be concave, which in this case is achieved by the half-arc tunnel. By arranging a set of LED light sources (202) along the tunnel-shaped illumination structure (102) it is possible to maintain an even and predictable pattern while at the same time being able to cover and inspect cylindrical target objects.

The arrangement (100) may further comprise one or more mirrors (108a, 108b) connected or externally placed in relation to the illumination structure (102) to improve the coverage of the surface of a target object (106) in one lighting scene image. The mirrors may be placed at one or two open ends of the illumination structure (102) or the mirrors may be placed in an angle in relation to the inside of the illumination structure (102). A mirror may be connected or connectable to the illumination structure (102). For example, the mirror may be manually connectable to the illumination structure (102) or it may be connected with a hinge or the like which may be moved to cover an end, side or such part of the illumination structure (102) when the imaging and inspection sequence is done. The mirrors (108a, 106b) can be planar mirrors.

In some embodiments, two or more illumination structures (102) can be connected in series to elongate the inspection area or zone. In some embodiments, two or more illumination structures (102) can be connected against each other to mirror and/or oppose each other such as they form a closed structure.

As mentioned before, the illumination structure (102) can have concave or convex portions and have geometrical shapes like half or full circle or ellipse. As illustrated, the illumination structure (102) shape may be a free form shape. The outline of the shape may comprise a curve that can be defined also as a changing radius curve having a radius in one direction but straight in the other direction as a tube or tunnel like form. However, as also illustrated the illumination structure (102) can have a quadrilateral cross-section constituting essentially a box-like shape. However, in all of the shapes the illumination structure (102) has a tunnel shape with preferably two open ends and a cross-section that is the same along the length of the illumination structure (102).

Further, the illumination structure (102) can be arranged to change intensity and wavelength according to predetermined images or patterns, i.e. illumination scenes. This illumination scene is reflected on the surface of the target object (106) and a number of images are formed by the one or more imaging units (106). One or more images may be taken under one or more illumination scenes.

A skilled person may on the basis of this disclosure and general knowledge apply the provided teachings in order to implement the scope of the present invention as defined by the appended claims in each particular use case with necessary modifications, deletions, and additions, if any.

For instance, in some embodiments, only some parts or portions of the target object may need to be analyzed, either in overall or at a time, for which purpose the illumination structure, related light sources, apertures and imaging devices may be configured so as to cover the relevant parts only in terms of the measurement or measurement round. The remaining parts/portions of the target object may be then measured during subsequent measurements by first rotating the object and/or arrangement relative to each other to expose new parts/portions to the illumination and imaging elements.

Still, in some embodiments the suggested arrangement and method may be utilized for measuring combination objects/surfaces, i.e. surfaces having both glossy and matte portions. For instance, defects may be tracked from combination surfaces. Different illumination modes (including patterns) may be exploited for the measurements and each surface element ultimately determined based on the best, according to predetermined criterion, result obtained.

The invention claimed is:

1. An arrangement for optically measuring surfaces of target objects, the arrangement comprising:
   a diffusive, semi-transparent illumination structure defining a hollow, elongated surface shape, constituting a tunnel shape, configured to surround at least a first target object at least partially,
   a number of LED (light-emitting diode) light sources optically coupled to the illumination structure for illuminating at least the first target object via the surface of the illumination structure, wherein the light sources are situated at a distance from the surface of the illumination structure, wherein the LED light sources are arranged in a matrix array along a curvilinear first cross-section of the illumination structure and along the length of the tunnel shape of the illumination structure, wherein the individual LED light sources have a beam opening angle and are spaced with a distance from one another,
   at least one imaging device, configured to image the target object through at least one apertures, in the illumination structure or from an open position on a side of the illumination structure, such that the illumination structure is not in between the imaging device and target object, and
   a control entity configured to instruct said LED light sources to form an image sequence of predetermined illumination patterns on the surface of the illumination structure to illuminate the target object with said patterns projected via said surface, to instruct the at least one imaging device to obtain one or more images of the target object relative to each illumination pattern, and to derive, through the utilization of said patterns utilized and images obtained, a predetermined surface-related property of the target object,
   wherein the illumination structure is a light-shaping diffusor having a substantially rough outer surface that refracts light rays in different directions due to altering refraction angles, the bulk material of the diffusor otherwise being clear, wherein the distance from the surface of the illumination structure the LED light sources are situated at is a distance that allows the LED light to spread and cover the diffusor uniformly, said distance depending at least on the beam opening angle, on the spacing of the LED light sources, and on a thickness of the light-shaping diffusor.

2. The arrangement of claim 1, wherein the tunnel shape comprises a second cross-section of a full circle, oval or such curvilinear shape.

3. The arrangement of claim 1, wherein the tunnel shape comprises a second cross-section of a quadrilateral shape.

4. The arrangement of claim 1, further comprising at least one mirror at either end or at both ends of the illumination structure.

5. The arrangement of claim 1, further comprising at least one mirror at an angle in relation the illumination structure.

6. The arrangement of claim 5, wherein narrow rigid PCBs (printed circuit boards), each comprising an array of LED light sources, are arranged adjacent and in an angle to each other along a curvilinear path over the illumination structure.

7. The arrangement of claim 1, wherein the LED light sources are arranged on narrow PCBs (printed circuit boards) such that LED light sources are arranged in a row adjacent to each other.

8. The arrangement of claim 7, wherein the narrow PCBs are narrow rigid PCBs.

9. The arrangement of claim 1, wherein LED light sources are arranged into rows of 1 to 20 LEDs.

10. The arrangement of claim 1, wherein LED light sources are arranged into rows of 1 to 10 LEDs.

11. The arrangement of claim 1, comprising an air gap between the LED light sources and the illumination structure surface.

12. The arrangement of claim 1, comprising an optically clear material structure between the light sources and the illumination structure surface.

13. The arrangement of claim 1, wherein the individual LED light sources are spaced with a distance of 1-20 millimeters.

14. The arrangement of claim 1, wherein at least one imaging device includes a CMOS (complementary metal oxide semiconductor) or CCD (charge-coupled device) technology-based camera.

15. The arrangement of claim 1, wherein at least one of said apertures is associated with a lens arrangement comprising a number of lenses.

16. The arrangement of claim 15, wherein the lens arrangement comprises a plurality of lenses arranged in series and a lens of said plurality disposed prior to at least one other lens of said plurality in the optical path has a diameter smaller than the other lens.

17. The arrangement of claim 15, wherein the lens arrangement comprises a body portion facing the aperture with a beveled edge to reduce the shadowing effect of the lens arrangement relative to the illumination structure.

18. The arrangement of claim 1, wherein the illumination structure comprises a rough outer surface that refracts light rays in different directions due to altering refraction angles.

19. The arrangement of claim 1, wherein the illumination structure contains or substantially consists of plastic or glass material.

20. The arrangement of claim 1, wherein the individual LED light sources are spaced with a distance of 1 to 20 millimeters, and the distance between the light sources and the illumination structure surface is 1 to 10 millimeters.

21. A method for optically measuring a surface of a target object, comprising:
   obtaining a diffusive, semi-transparent illumination structure defining a hollow, elongated surface shape, constituting a tunnel shape, configured to surround the target object at least partially, wherein a number of LED (light-emitting diode) light sources are optically coupled to the illumination structure for illuminating the target object via the surface of the illumination structure, wherein the light sources are situated at a distance from the surface of the illumination structure, wherein the LED light sources are arranged in a matrix array along a curvilinear cross-section of the illumination structure and along the length of the tunnel shape of the illumination structure, wherein the individual LED light sources have a beam opening angle and are spaced with a distance from one another, obtaining at least one imaging device, configured to image the target object through at least one apertures, in the illumination structure or from an open position on a side of the illumination structure, such that the illumination structure is not in between the imaging device and target object, controlling the LED (light-emitting diode) light sources to form an image sequence of predetermined illumination patterns on the surface of the illumination structure to illuminate the target object with said patterns projected via said surface and instructing said at least one imaging device to obtain one or more images of the target object relative to each illumination pattern, and deriving, through the utilization of said patterns utilized and images obtained, a predetermined surface-related property of the target object or at least part thereof, wherein the illumination structure is a light-shaping diffusor having a substantially rough outer surface that refracts light rays in different directions due to altering refraction angles, the bulk material of the diffusor otherwise being clear, wherein the distance from the surface of the illumination structure the LED light sources are situated at is a distance that allows the LED light to spread and cover the diffusor uniformly, said distance depending at least on the beam opening angle, on the spacing of the LED light sources, and on a thickness of the light-shaping diffusor.

22. An arrangement for optically determining defects of a surface of a target object, the surface having glossy and matte portions, the arrangement comprising:

a diffusive, semi-transparent illumination structure defining a tunnel shape, configured to surround the target object at least partially, a number of LED (light-emitting diode) light sources optically coupled to the illumination structure for illuminating the glossy and matte portions of the surface of the target object via the surface of the illumination structure, wherein the light sources are situated at a distance from the surface of the illumination structure, wherein the LED light sources are arranged in a matrix array along a first curvilinear cross-section of the illumination structure and along the length of the tunnel shape of the illumination structure, at least one camera, configured to image the target object through at least one lens-provided aperture, in the illumination structure or from an open position on a side of the illumination structure, such that the illumination structure is not between the imaging device and the target object, and a control entity that is configured:

to instruct the LED light sources to form a first image sequence of predetermined illumination patterns on the surface of the illumination structure to illuminate the glossy and matte portions with said patterns projected via said surface, to instruct the at least one camera to obtain one or more first images of the target object relative to each illumination pattern of the first image sequence, to instruct the LED light sources to change intensity and wavelength according to at least a subset of the one or more first obtained images, to form one or more further image sequences of predetermined illumination patterns on the surface of the illumination structure to illuminate the glossy and matte portions with said patterns projected via said surface, to instruct the at least one camera to obtain one or more further images of the target object relative to the illumination patterns of the one or more further image sequences, to determine, based on the one or more further images, one or more best combinations of patterns, intensity and wavelength, for determining defects on the glossy portion and for determining defects on the matte portion, and to determine, using the one or more best combinations of patterns, intensity and wavelength utilized and the images obtained, one or more defects of the surface of the target object.

\* \* \* \* \*